United States Patent
Kwack et al.

(10) Patent No.: US 9,230,468 B2
(45) Date of Patent: Jan. 5, 2016

(54) DISPLAY DEVICE

(75) Inventors: Jun-Ho Kwack, Yongin (KR);
Hyun-Jae Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 110 days.

(21) Appl. No.: 13/429,264

(22) Filed: Mar. 23, 2012

(65) Prior Publication Data

US 2013/0036638 A1    Feb. 14, 2013

(30) Foreign Application Priority Data

Aug. 10, 2011    (KR) .................. 10-2011-0079674

(51) Int. Cl.
*G09G 3/20*      (2006.01)
*G06F 1/16*      (2006.01)
*G02F 1/1333*    (2006.01)

(52) U.S. Cl.
CPC .............. *G09G 3/20* (2013.01); *G06F 1/1652* (2013.01); *G02F 1/133305* (2013.01); *G09G 2310/04* (2013.01); *G09G 2380/02* (2013.01)

(58) Field of Classification Search
USPC ................................... 40/514, 518
See application file for complete search history.

(56) References Cited

U.S. PATENT DOCUMENTS 5,946,836 A * 9/1999 Sahebolamri ............. 40/471
6,043,483 A * 3/2000 Schreiber ............. 250/231.13
6,178,674 B1 * 1/2001 Decaux et al. ............. 40/471
6,269,860 B1 * 8/2001 Ishikawa et al. ............. 156/750
7,210,257 B2 * 5/2007 McKinley ............. 40/453
7,408,698 B2   8/2008 Kuo
2002/0070910 A1   6/2002 Fujieda et al.
2005/0176470 A1 * 8/2005 Yamakawa ............. 455/566
2005/0273356 A1 * 12/2005 Holoubek ............. 705/1
2006/0020469 A1   1/2006 Rast
2008/0150885 A1 * 6/2008 Overwijk et al. ............. 345/107
2011/0043479 A1   2/2011 van Aerle et al.

FOREIGN PATENT DOCUMENTS

| CN | 1701349 A   | 11/2005 |
|----|-------------|---------|
| CN | 2862088 Y   | 1/2007  |
| CN | 101782814 A | 7/2010  |
| CN | 101946220 A | 1/2011  |
| JP | 11-143386 A | 5/1999  |
| JP | 2002-182582 | 6/2002  |
| JP | 2005-278058 | 10/2005 |
| JP | 2005-321702 | 11/2005 |
| JP | 2007-286094 | 11/2007 |

(Continued)

OTHER PUBLICATIONS

European Search report dated Nov. 29, 2012, for corresponding European Patent application 12178548.9, (8 pages).

(Continued)

*Primary Examiner* — Gary Hoge
(74) *Attorney, Agent, or Firm* — Christie, Parker & Hale, LLP (57) ABSTRACT

A display device includes: a flexible display panel including a recognition pattern; a housing for holding the flexible display panel, wherein varying amounts of a display area of the flexible display panel are exposable to the outside to display an image; and a sensor in the housing for sensing an amount of the exposed display area corresponding to the recognition pattern.

18 Claims, 9 Drawing Sheets

(56) References Cited

FOREIGN PATENT DOCUMENTS

| | | |
|---|---|---|
| JP | 2008-171148 | 7/2008 |
| JP | 2009-276750 | 11/2009 |
| JP | 4607192 B2 | 1/2011 |
| KR | 10-0781708 B1 | 11/2007 |
| KR | 10-2010-0027502 A | 3/2010 |
| KR | 10-2011-0048705 A | 5/2011 |
| WO | WO 2004/084171 A1 | 9/2004 |
| WO | WO 2007/077649 A1 | 12/2007 |

OTHER PUBLICATIONS

JPO Office action dated Jun. 9, 2015, for corresponding Japanese Patent application 2011-251519, (4 pages).

SIPO Office action dated Aug. 20, 2015, for corresponding Chinese Patent application 201210277966.0, (9 pages).

* cited by examiner

First direction

FIG. 9

DISPLAY DEVICE

CROSS-REFERENCE TO RELATED APPLICATION

This application claims priority to and the benefit of Korean Patent Application No. 10-2011-0079674 filed in the Korean Intellectual Property Office on Aug. 10, 2011, the entire content of which is incorporated herein by reference.

BACKGROUND

1. Field

The described technology relates generally to a display device. More particularly, the described technology relates to a display device including a flexible display panel.

2. Description of Related Art

A display device is a device for displaying an image, and flexible display devices have recently been more widely developed and implemented in various devices and applications.

A conventional flexible display device is a device including a flexible display panel for displaying an image, and can be more portable because the size of the flexible display can be reduced by being folded or rolled.

The above information disclosed in this Background section is only for enhancement of understanding of the background of the described technology, and therefore, may contain information that does not form the prior art that is already known in this country to a person of ordinary skill in the art.

SUMMARY OF THE INVENTION

The described technology has been made in an effort to provide a display device for displaying an image that has optimized or improved characteristics in view of the flexibility of a flexible display panel.

One aspect of an exemplary embodiment of the present invention provides a display device including: a flexible display panel including a recognition pattern; a housing for holding the flexible display panel, wherein varying amounts of a display area of the flexible display panel are exposable to the outside to display an image; and a sensor in the housing for sensing an amount of the exposed display area corresponding to the recognition pattern.

The display device may further include a controller connected with the sensor and the flexible display panel for displaying an image corresponding to the amount of the exposed display area sensed by the sensor.

The flexible display panel may further include a non-display area neighboring the display area, wherein the recognition pattern may be in the non-display area.

The flexible display panel may be configured to enter and exit the housing along a first direction, and the recognition pattern may be formed in the flexible display panel along the first direction.

The recognition pattern may include first sub-patterns for absorbing light and second sub-patterns for reflecting light that are alternately arranged along the first direction, and the sensor may include a photo sensor including a light emitting portion and a light receiving portion neighboring each other.

The recognition pattern may include a bar code and the sensor may be configured to read or recognize the bar code.

The recognition pattern may include an ideogram and the sensor may be configured to read or recognize the ideogram.

The recognition pattern may include first sub-patterns for transmitting light and second sub-patterns for blocking light, wherein the first sub-patterns and the second sub-patterns are alternately arranged along the first direction, and the sensor may include a photo sensor including a light emitting portion and a light receiving portion that are arranged on opposite sides of the recognition pattern.

The housing may include a roll portion in the housing for rolling or storing the flexible display panel.

According to exemplary embodiments of the present invention, a display device that can display an image optimized to the characteristic of flexibility of the flexible display panel.

DETAILED DESCRIPTION OF THE EMBODIMENTS

The present invention will be described more fully hereinafter with reference to the accompanying drawings, in which exemplary embodiments of the invention are shown. As those skilled in the art will recognize, the described embodiments may be modified in various different ways without departing from the spirit or scope of the present invention.

In order to more clearly describe the embodiments, parts that are not related to the description thereof will be omitted. In addition, like reference numerals designate like elements throughout the specification.

Elements having the same or similar structures throughout the embodiments are denoted by the same reference numerals and are described in a first exemplary embodiment. In subsequent exemplary embodiments, only the elements other than the same or similar elements from previous embodiments will be described in greater detail.

In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In addition, in the drawings, for understanding and ease of description, the thicknesses of some layers and areas are exaggerated. It will also be understood that when an element is referred to as being "on" another element, it can be directly on the other element, or one or more intervening elements may also be present.

In addition, throughout the specification, "on" implies being positioned above or below a target element, and does not necessarily imply being positioned on top based on, for example, a gravitational direction.

Hereinafter, a display device according to a first exemplary embodiment will be described with reference to FIG. 1 to FIG. 4.

Figure 1:
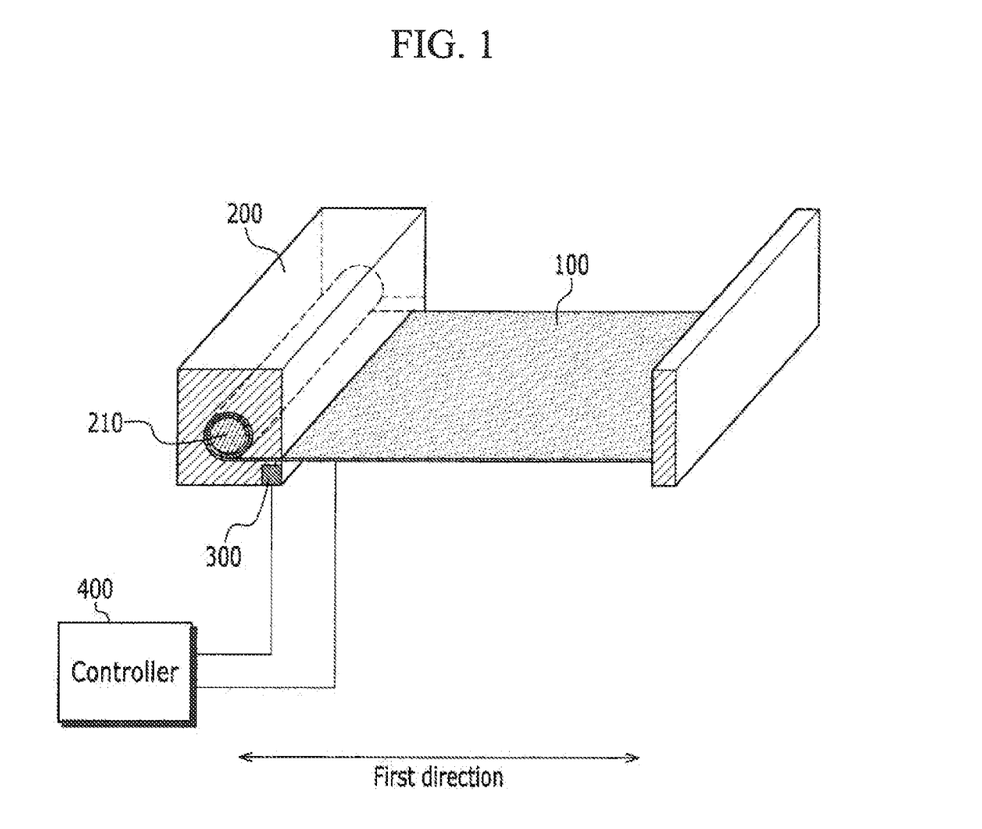
FIG. 1 shows a display device according to a first exemplary embodiment.

As shown in FIG. 1, the display device according to the first exemplary embodiment includes a flexible display panel 100, a housing 200, a sensor 300, and a controller 400.

The flexible display panel 100 displays an image processed in the display device. For example, if the display device is provided as a portable terminal such as a mobile phone, the flexible display panel 100 may display an image such as a user interface (IU) or a graphic user interface (GUI). The flexible display panel 100 may include flexible substrates or films arranged opposite to each other, with interposing liquid crystals or organic light emitting diodes therebetween. The flexible display panel 100 may be a transparent or light transmissive type display panel, through which it is possible to view the outside or other side. On a top side of the flexible display panel 100, a touch sensor provided as a touch film, a touch sheet, or a touch pad may be provided to sense touch operations. The flexible display panel 100 is connected with the controller 400, and displays an image using a signal transmitted from the controller 400. The flexible display panel 100 has flexibility, and may be put or retracted into or taken out of the housing 200. The flexible display panel 100 may be put into and taken out of the housing 200 along a first direction, and a display area of the flexible display panel 100 is variably exposed to the outside.

Figure 2:
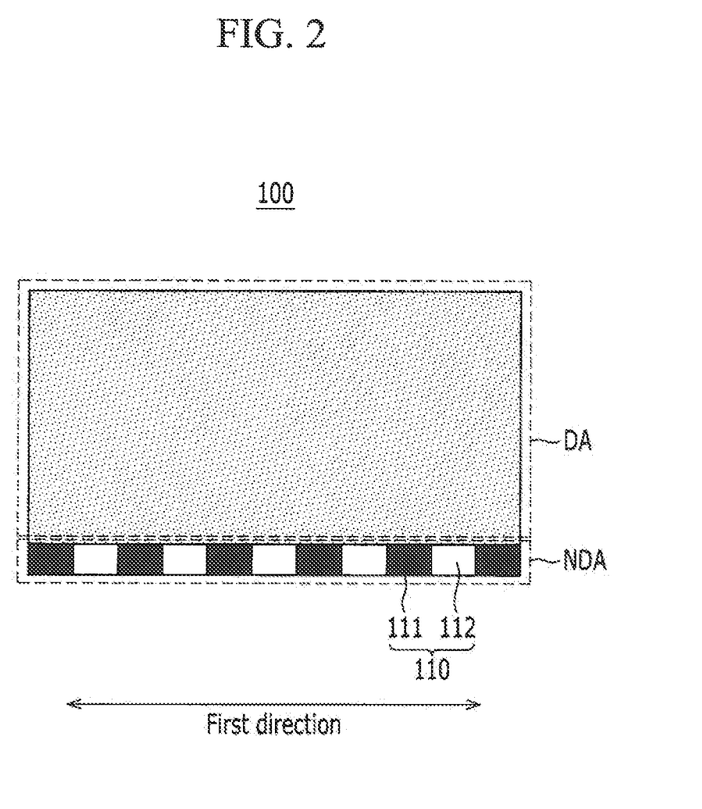
FIG. 2 shows a flexible display panel of the display device according to the first exemplary embodiment.

FIG. 2 shows the flexible display panel of the display device according to the first exemplary embodiment.

As shown in FIG. 2, the flexible display panel 100 includes a display area DA for displaying an image, a non-display area NDA neighboring the display area DA, and a recognition pattern 110 disposed on the non-display area NDA.

In the display device according to the first exemplary embodiment, the display area DA and the non-display area NDA may be disposed on a top or first side of the flexible display panel 100, but the present invention is not limited thereto. For example, the display area DA may be disposed on the top side of the flexible display panel 100, while the non-display area NDA may be disposed on the bottom or second side of the flexible display panel 100. In other words, when an image is displayed on the top side of the flexible display panel 100, the recognition pattern 110 may be disposed on the bottom side or on the top side of the flexible display panel 100 according to different embodiments.

Figure 9:
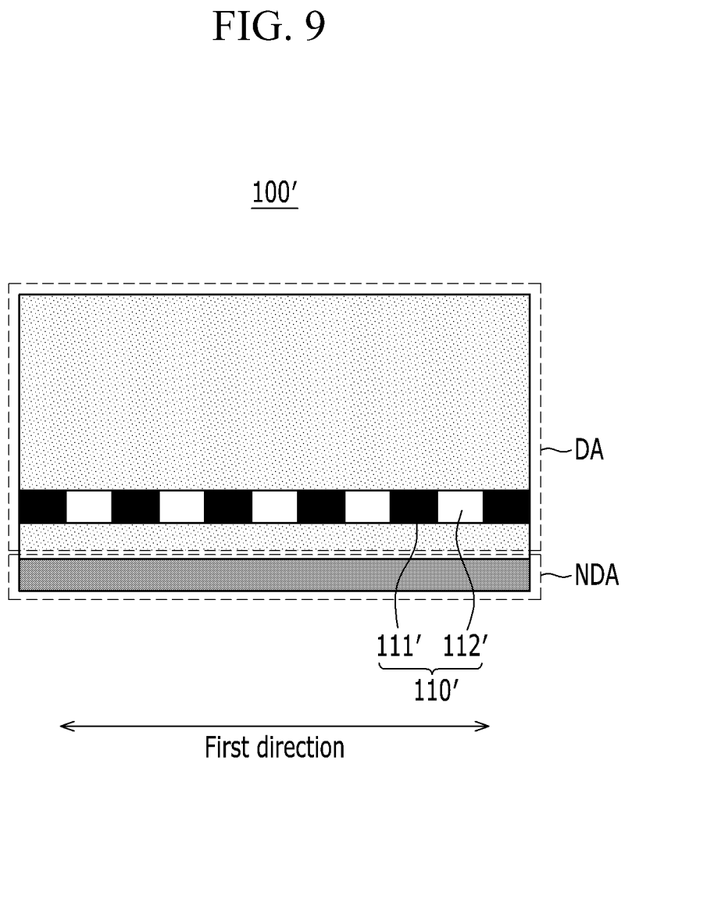
FIG. 9 shows a display device according to another embodiment.

The recognition pattern 110 of the display device according to the first exemplary embodiment is disposed in the non-display area NDA, but a recognition pattern of a display device according to another exemplary embodiment may instead be disposed in a display area DA where an image is displayed, as shown in FIG. 9, for example.

The recognition pattern 110 (or 110') may also be disposed between two neighboring substrates, and it may be formed simultaneously when a wire or a touch sensor of the flexible display panel 100 (or 100') is formed. The recognition pattern 110 (or 110') is arranged along a first direction along which the flexible display panel 100 (or 100') is put into or taken out of the housing 200. The recognition pattern 110 (or 110') includes first sub-patterns 111 (or 111') and second sub-patterns 112 (or 112') that are alternately arranged along the first direction. The first sub-pattern 111 (or 111') may have a black color for absorbing light and the second sub-pattern 112 (or 112') may have a white color for reflecting light.

Referring back to FIG. 1, the housing 200 supports one end of the flexible display panel 100, and receives or discharges the flexible display panel 100, so that the display area of the flexible display panel 100 is variably exposed. The housing 200 includes a roll portion 210 around which the flexible display panel 100 can be rolled. The roll portion 210 is disposed in the housing 200 and supports one end of the flexible display panel 100. The roll portion 210 rolls the flexible display panel 100 clockwise or counterclockwise, to allow the housing 200 to receive or discharge the flexible display panel 100 along the first direction. The roll portion 210 is rotatable in a passive or active manner, and the flexible display panel 100 can be put into or taken out of the housing 200 along the first direction as the roll portion 210 rotates. The sensor 300 may also be disposed in the housing 200.

Figure 3:
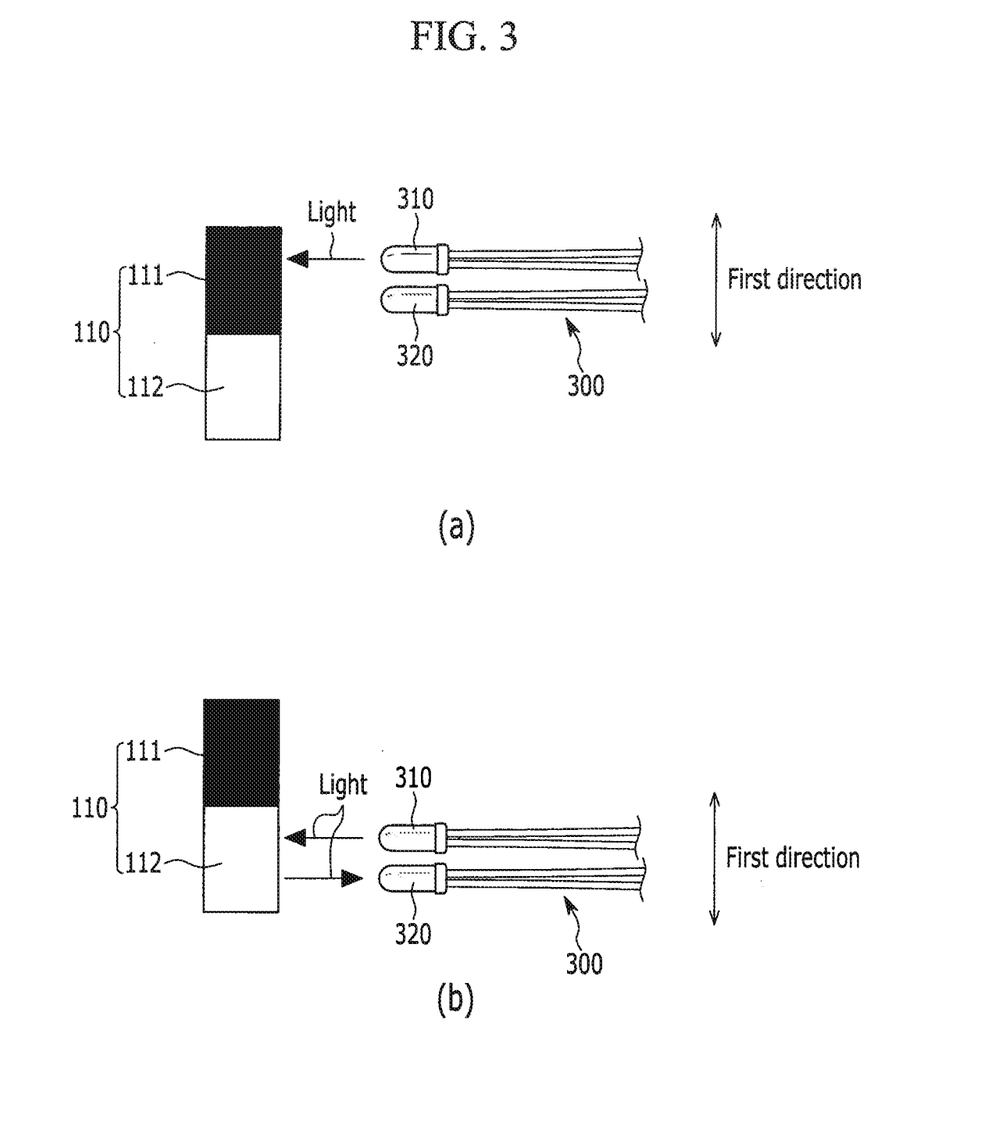
FIG. 3 is provided to describe a sensing method of the display device according to the first exemplary embodiment.

FIG. 3 is provided for describing a sensing method of the display device according to the first exemplary embodiment.

As shown in FIG. 3, the sensor 300 is disposed in the housing 200, and may correspond to the recognition pattern 110 disposed in the non-display area NDA of the flexible display panel 100. The sensor 300 may sense an amount of display area of the flexible display panel 100 that is exposed to the outside as the flexible display panel 100 is discharged from the housing 200, by for example, detecting and recognizing the recognition pattern 110.

The sensor 300 is a photo sensor including a first light emission portion 310 and a first light receiving portion 320 that may be arranged to be adjacent to each other.

The first light emission portion 310 emits light toward the recognition pattern 110, and the first light receiving portion 320 receives the light that is emitted from the first light emission portion 310 and then reflected by the recognition pattern 110.

The sensor 300 senses an amount of the display area of the flexible display panel 100 that is exposed to the outside as the flexible display panel 100 is discharged from the housing 200, by recognizing the recognition pattern 110 using the first light emission portion 310 and the first light receiving portion 320. Particularly, as shown in FIG. 3(b), when the flexible display panel 100 enters or exits the housing 200 along the first direction, light emitted from the first light emission portion 310 is reflected only by the second sub-pattern 112 of the recognition pattern 110 and then recognized by the first light receiving portion 320. Accordingly, the sensor 300 can count a number of second sub-patterns 112 recognized by the first light receiving portion 320, to sense the amount of the display area of the flexible display panel 100 exposed to the outside, as the flexible display panel 100 is discharged from the housing 200 along the first direction. A signal related to the exposed display area of the flexible display panel 100, and sensed by the sensor 300, may be transmitted to the controller 400.

Figure 4:
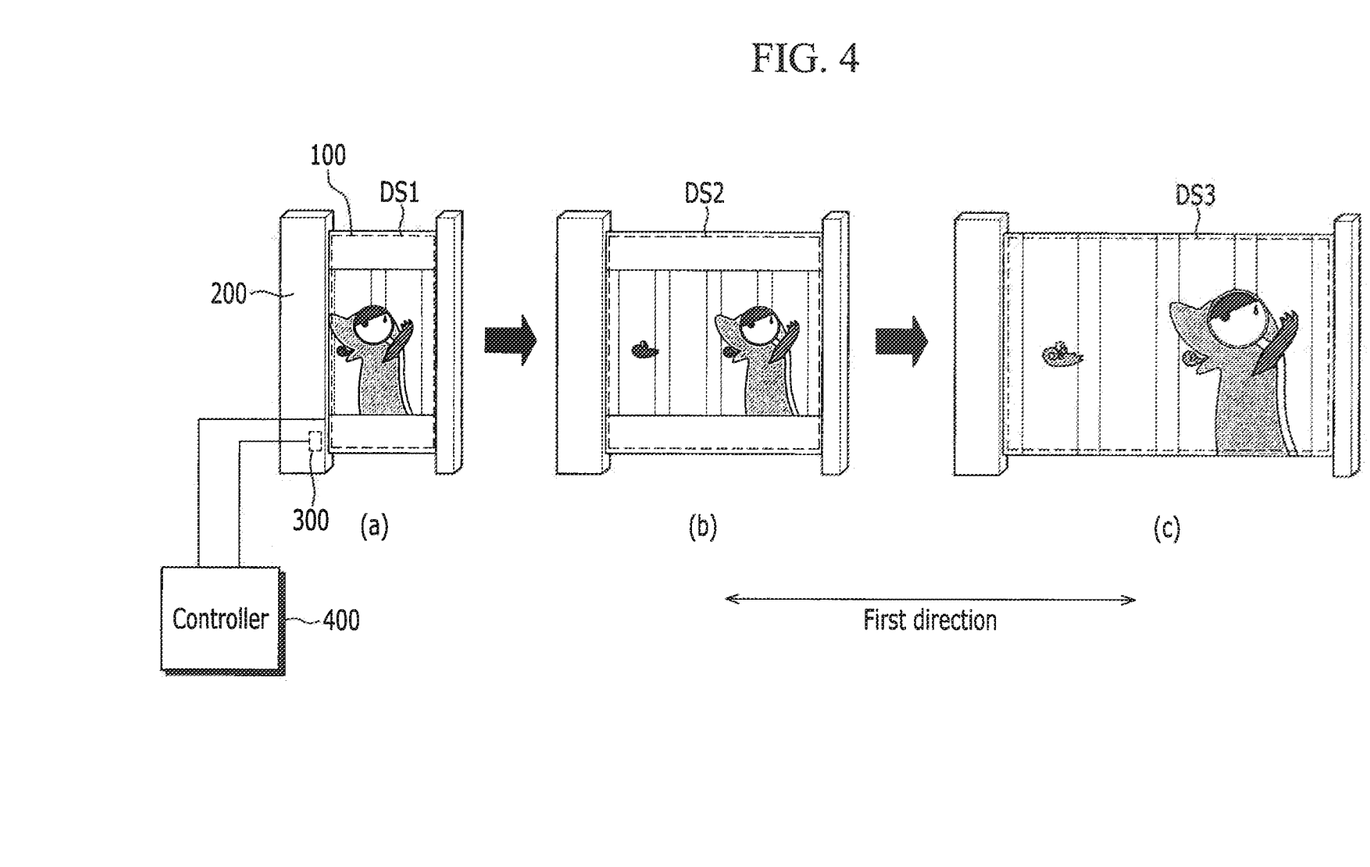
FIG. 4 shows an image that the flexible display panel of the display device according to the first exemplary embodiment displays.

FIG. 4 shows an image displayed by the flexible display panel of the display device according to the first exemplary embodiment.

As shown in FIG. 4, the controller 400 is connected with the sensor 300 and the flexible display panel 100, and adjusts and displays an image corresponding to an amount of exposed display area of the flexible display panel 100 sensed by the sensor 300 through the flexible display panel 100.

Particularly, as shown in FIG. 4(a), when a first length of the flexible display panel 100 is discharged from the housing 200 along the first direction, where a first display area DS1 is exposed, the sensor 300 senses the first display area DS1 and transmits a signal adjusted for the display area DS1 to the controller 400. The controller 400 receives the signal and displays an image having a first size corresponding to the first display area DS1 of the flexible display panel 100.

In addition, as shown in FIG. 4(b), when a second length of the flexible display panel 100 is discharged from the housing 200 along the first direction, where a second display area DS2 that is larger than the first display area DS1 is exposed, the sensor 300 senses the second display area DS2 and transmits a signal adjusted for the second display area DS2 to the controller 400. The controller 400 receives the signal and displays an image having a second size corresponding to the second display area DS2 of the flexible display panel 100.

Further, as shown in FIG. 4(c), when a third length of the flexible display panel 100 is discharged from the housing 200 along the first direction, where a third display area DS3 that is larger than the second display area DS2 is exposed, the sensor 300 senses the third display area DS3 and transmits a signal adjusted for the third display area DS3 to the controller 400. The controller 400 receives the signal and displays an image having a third size corresponding to the third display area DS3 of the flexible display panel 100.

As described above, in the display device according to the first exemplary embodiment, the sensor 300 recognizes the recognition pattern 110 formed in the flexible display panel 100 to sense the amount of the display area of the flexible display panel 100 exposed to the outside, and an image corresponding to the exposed display area is displayed on or through the flexible display panel 100, so that the image can be optimized for characteristics of flexibility of the flexible display panel 100 based on, for example, an exposed display area.

In particular, the display device according to the first exemplary embodiment recognizes the recognition pattern 110 formed in the flexible display pattern 100 using the sensor 300 to sense an amount of the display area of the flexible display panel 100 exposed to the outside as the flexible display panel 100 is discharged from the housing 200, and as such, the amount of display area can be accurately sensed even though the exposed portion is non-linearly twisted.

That is, the display device according to the first exemplary embodiment senses the display area of the flexible display panel 100 exposed to the outside using the sensor 300, which recognizes the recognition pattern 110 when the flexible display panel 100 is put into or taken out of the housing 200 in real time, rather than sensing the entire area of the flexible display panel 100 after the flexible display panel 100 is taken out of the housing 200. Thus, even though the exposed portion of the flexible display panel 100 is non-linearly twisted due to the characteristics of flexibility, an image having a size corresponding to the exposed display area of the flexible display panel 100 can be displayed by accurately sensing the exposed display area in such a manner.

Further, the display device according to the first exemplary embodiment senses the exposed display area of the flexible display panel 100 by recognizing the recognition pattern 110 formed in the flexible display panel 100 in real time in the above manner, rather than indirectly sensing the display area of the flexible display panel 100 by, for example, counting a number of rotations of the roll portion 210 or sensing the display area of the flexible display panel 100 after it is rolled out using a distance measurement means, such as using infrared rays or ultrasonic waves. Accordingly, an image having an accurate size that corresponds to the variable display area of the flexible display panel 100 is variably displayed by the flexible display panel 100. This may act, for example, as a factor for improving satisfaction of a user of the display device.

A display device according to a second exemplary embodiment will be described with reference to FIG. 5.

Figure 5:
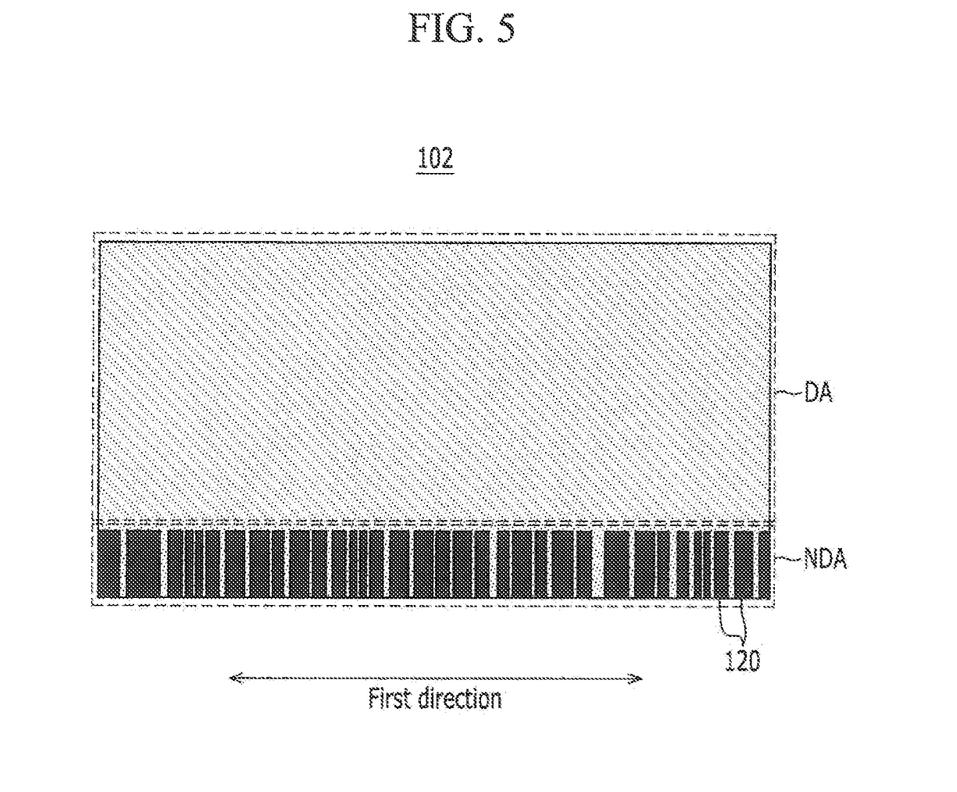
FIG. 5 shows a flexible display panel of a display device according to a second exemplary embodiment.

FIG. 5 shows a flexible display panel of the display device according to the second exemplary embodiment.

As shown in FIG. 5, a flexible display panel 102 of the display device according to the second exemplary embodiment includes a display area DA for displaying an image, a non-display area NDA neighboring the display area DA, and a recognition pattern 120 in the non-display area NDA.

The recognition pattern 120 may be arranged on a top or a bottom side of the flexible display panel 102, or may be between two neighboring substrates, and the recognition pattern 120 may be formed substantially simultaneously as when a wire or a touch sensor of the flexible display panel 102 is formed. The recognition pattern 120 is arranged along a first direction along which the flexible display panel 102 is put or retracted into or taken out of a housing 200. The recognition pattern 120 has a shape of, for example, a bar code arranged along the first direction.

The sensor 300 senses an amount of display area of the flexible display panel 102 exposed to the outside as the flexible display panel 102 is discharged from the housing 200 by recognizing specific portions of the bar code of the recognition pattern 120.

Particularly, when the flexible display panel 102 is discharged from the housing 200 along the first direction, the sensor 300 scans the bar code of the recognition pattern 120 to sense the amount of currently exposed display area according to the recognition pattern 120.

As described above, the recognition pattern 120 has the shape of a bar code, and the sensor 300 scans the bar code of the recognition pattern 120 to sense an amount of the currently exposed display area of the flexible display panel 102, to thereby display an image corresponding to the amount of exposed display area on the flexible display panel 102. Therefore, the display device according to the second exemplary embodiment can also provide an image optimized for characteristics of flexibility of the flexible display panel 102 based on, for example, an exposed display area.

Hereinafter, a display device according to a third exemplary embodiment will be described with reference to FIG. 6.

Figure 6:
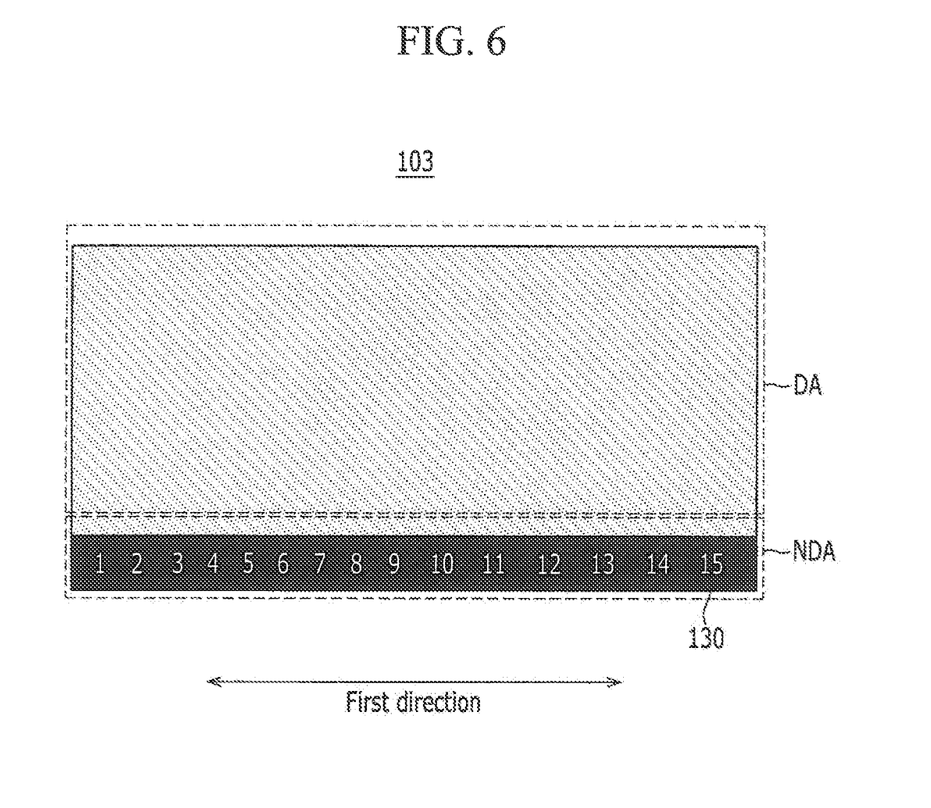
FIG. 6 shows a flexible display panel of a display device according to a third exemplary embodiment.

FIG. 6 shows a flexible display panel of the display device according to the third exemplary embodiment.

As shown in FIG. 6, a flexible display panel 103 of the display device according to the third exemplary embodiment includes a display area DA, a non-display area NDA neighboring the display area DA, and a recognition pattern 130 in the non-display area NDA.

The recognition pattern 130 may be arranged on an upper or a bottom side of the flexible display panel 103, or may be between two neighboring substrates, and may be formed substantially simultaneously as when a wire or touch sensor of the flexible display panel 103 is formed. The recognition pattern 130 is arranged along a first direction along which the flexible display panel 103 is put or retracted into or taken out of the housing 200. The recognition pattern 130 has a shape (e.g., a predetermined shape) of an ideogram along the first direction.

The sensor 300 senses an amount of display area of the flexible display panel 103 exposed to the outside as the flexible display panel 103 is discharged from the housing 200 by recognizing the ideogram of the recognition pattern 130.

Particularly, when the flexible display panel 103 is put into or discharged from the housing 200 along the first direction, the sensor 300 scans the ideogram of the recognition pattern 130 to sense the amount of currently exposed display area of the flexible display panel 103. For example, if the predetermined ideogram of the recognition pattern 130 is represented by Arabic numerals, and when the sensor 300 scans Arabic numeral "5", the display area of the flexible display panel 103 exposed to the outside corresponds to a fifth step, and the flexible display panel 103 may display an image having a size corresponding to the fifth step.

As described above, according to the third exemplary embodiment, the recognition pattern 130 includes an ideogram, and the sensor 300 scans the ideogram of the recognition pattern 130 to sense an amount of the currently exposed display area of the flexible display panel 103, and thus an image corresponding to the currently exposed display area can be displayed on the flexible display panel 103. Accordingly, the display device can display an image optimized for characteristics of flexibility of the flexible display panel 103 based on, for example, an exposed display area.

Hereinafter, a display device according to a fourth exemplary embodiment will be described with reference to FIG. 7 and FIG. 8.

Figure 7:
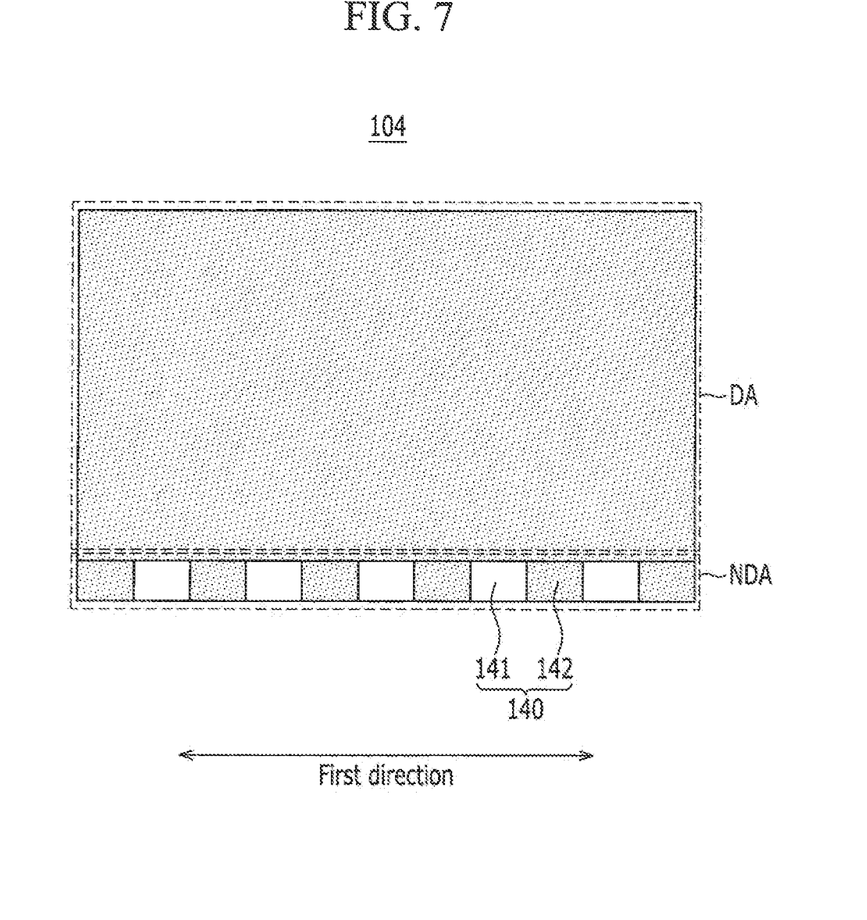
FIG. 7 shows a flexible display panel of a display device according to a fourth exemplary embodiment.

FIG. 7 shows a flexible display panel of the display device according to the fourth exemplary embodiment.

As shown in FIG. 7, a flexible display panel 104 includes a display area DA for displaying an image, a non-display area NDA neighboring the display area DA, and a recognition pattern 140 in the non-display area NDA.

The recognition pattern 140 may be arranged on an upper or a bottom side of the flexible display panel 104, or may be between two neighboring substrates, and the recognition pattern 140 may be formed substantially simultaneously as when a wire or touch sensor of the flexible display panel 104 is formed, or may be formed in an additional window that can protect the flexible display panel 104. The recognition pattern 140 is arranged along a first direction along which the flexible display panel 104 is put or retracted into or taken out of a housing 200. The recognition pattern 140 includes third sub-patterns 141 and fourth sub-patterns 142 alternately arranged along the first direction. The third sub-pattern 141 may be made of a transparent material that transmits light or may be a hole, and the fourth sub-pattern 142 may be made of an opaque material that blocks light.

Figure 8:
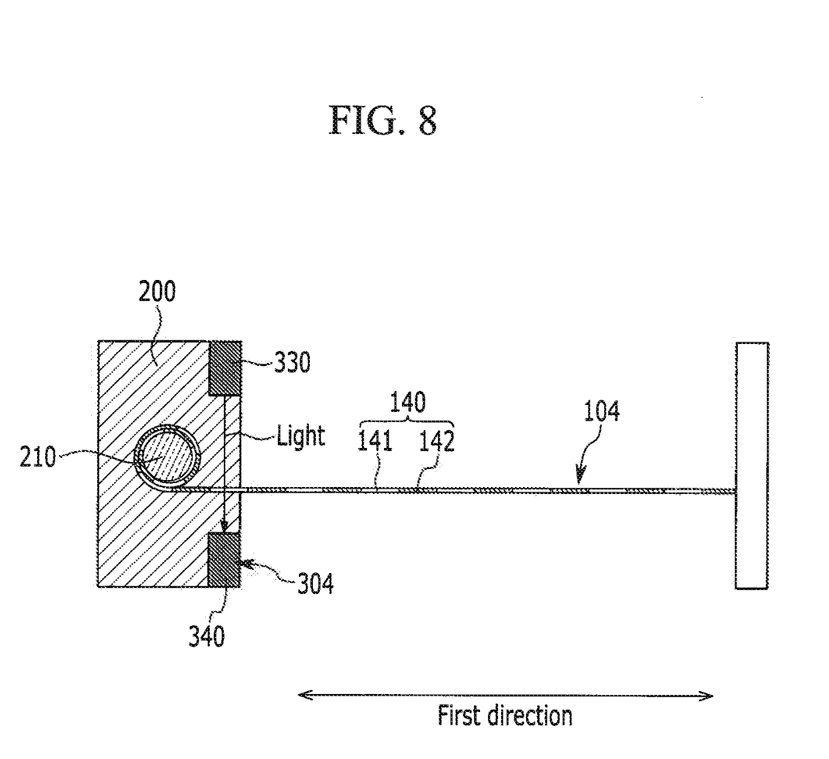
FIG. 8 is provided to describe a sensing method of the display device according to the fourth exemplary embodiment.

FIG. 8 is provided for description of a sensing method of the display device according to the fourth exemplary embodiment.

As shown in FIG. 8, a sensor 304 is positioned in the housing 200 corresponding to the recognition pattern 140 in the non-display area NDA. The sensor 304 senses an amount of display area of the flexible display panel 104 exposed to the outside as the flexible display panel 104 is discharged from the housing 200.

The sensor 304 may be a photo sensor including a second light emitting portion 330 and a second light receiving portion 340 that are arranged opposite to each other, with the recognition pattern 140 interposed therebetween.

The second light emitting portion 330 emits light toward the recognition pattern 140, and the second light receiving portion 340 receives light that is emitted from the second light emitting portion 330 and that passes through the recognition pattern 140.

The sensor 304 recognizes the recognition pattern 140 using the second light emitting portion 330 and the second light receiving portion 340 to sense an amount of the display area of the flexible display panel 104 exposed to the outside as the flexible display panel 104 is discharged from the housing 200. Particularly, when the flexible display panel 104 is discharged from the housing 200 along the first direction, light emitted from the second light emitting portion 330 only passes through the third sub-patterns 141 of the recognition pattern 140, to then be recognized by the second light receiving portion 340. Therefore, the sensor 304 counts the number of third sub-patterns 141 recognized by the second light receiving portion 340, to sense and determine an amount of the display area exposed to the outside as the flexible display panel 104 is discharged from the housing 200. A signal related to the amount of exposed display area of the flexible display panel 104, sensed by the sensor 304, may be transmitted to a controller 400.

As described, the display device 304 according to the fourth exemplary embodiment senses the amount of display area of the flexible display panel 104 exposed to the outside as the flexible display panel 104 is put into or taken out of the housing 200, by recognizing the recognition pattern 140 in the flexible display panel 104 using the sensor 140. The flexible display panel 104 can then display an image corresponding to the amount of exposed display area. Accordingly, the image displayed by the flexible display panel 104 can be optimized for characteristics of flexibility of the flexible display panel 104 based on, for example, an exposed display area.

While this disclosure has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A display device comprising:
a flexible display panel comprising a recognition pattern;
a housing for holding the flexible display panel, wherein varying amounts of a display area of the flexible display panel are exposable to the outside of the housing for displaying a first image on the display area of the exposed display panel, such that in a first position a first amount of the display area is exposed and a size of the entire first image is adjusted to fit the first amount of the display area, and in a second position a second amount of the display area variably compared with the first amount of the display area is exposed and the size of the entire first image is adjusted to fit the second amount of the display area; and
a sensor in the housing for sensing an amount of the exposed display area corresponding to the recognition pattern,
wherein the flexible display panel further comprises a non-display area neighboring the display area, and
wherein the recognition pattern is disposed in the display area.

2. The display device of claim 1, further comprising a controller connected with the sensor and the flexible display panel, the controller for displaying an image corresponding to the amount of the exposed display area sensed by the sensor.

3. The display device of claim 2, wherein the recognition pattern is also in the non-display area.

4. The display device of claim 1, wherein the flexible display panel is configured to enter and exit the housing along a first direction, and wherein the recognition pattern is formed in the flexible display panel along the first direction.

5. The display device of claim 4, wherein the recognition pattern comprises first sub-patterns for absorbing light and second sub-patterns for reflecting light that are alternately arranged along the first direction, and the sensor comprises a photo sensor comprising a light emitting portion and a light receiving portion neighboring each other.

6. The display device of claim 4, wherein the recognition pattern comprises a bar code and the sensor is configured to read or recognize the bar code.

7. The display device of claim 4, wherein the recognition pattern comprises an ideogram and the sensor is configured to read or recognize the ideogram.

8. The display device of claim 4, wherein the recognition pattern comprises first sub-patterns for transmitting light and second sub-patterns for blocking light, wherein the first sub-patterns and the second sub-patterns are alternately arranged along the first direction, and the sensor comprises a photo sensor comprising a light emitting portion and a light receiving portion that are arranged on opposite sides of the recognition pattern.

9. The display device of claim 1, wherein the housing comprises a roll portion in the housing for rolling or storing the flexible display panel.

10. A display device comprising:
a flexible display panel comprising a recognition pattern;
a housing for holding the flexible display panel and defining a display area of the flexible display panel, wherein a size of the entire display device is adjustable to vary amounts of the display area of the flexible display panel exposable to the outside for displaying an image, such that in a first position a first amount of the display area is exposed and in a second position a second amount of the display area variably compared with the first amount of the display area is exposed; and
a sensor in the housing for sensing an amount of the exposed display area corresponding to the recognition pattern,
wherein the flexible display panel further comprises a non-display area neighboring the display area, and
wherein the recognition pattern is disposed in the display area.

11. The display device of claim 10, further comprising a controller connected with the sensor and the flexible display panel, the controller for displaying an image corresponding to the amount of the exposed display area sensed by the sensor.

12. The display device of claim 11, wherein the recognition pattern is also in the non-display area.

13. The display device of claim 10, wherein the flexible display panel is configured to enter and exit the housing along a first direction, and wherein the recognition pattern is formed in the flexible display panel along the first direction.

14. The display device of claim 13, wherein the recognition pattern comprises first sub-patterns for absorbing light and second sub-patterns for reflecting light that are alternately arranged along the first direction, and the sensor comprises a photo sensor comprising a light emitting portion and a light receiving portion neighboring each other.

15. The display device of claim 13, wherein the recognition pattern comprises a bar code and the sensor is configured to read or recognize the bar code.

16. The display device of claim 13, wherein the recognition pattern comprises an ideogram and the sensor is configured to read or recognize the ideogram.

17. The display device of claim 13, wherein the recognition pattern comprises first sub-patterns for transmitting light and second sub-patterns for blocking light, wherein the first sub-patterns and the second sub-patterns are alternately arranged along the first direction, and the sensor comprises a photo sensor comprising a light emitting portion and a light receiving portion that are arranged on opposite sides of the recognition pattern.

18. The display device of claim 10, wherein the housing comprises a roll portion in the housing for rolling or storing the flexible display panel.

* * * * *